(12) United States Patent
Kim et al.

(10) Patent No.: US 9,752,290 B2
(45) Date of Patent: Sep. 5, 2017

(54) RAINWATER RECEIVER OF MOVABLE BOARDING BRIDGE

(71) Applicant: Korea Airports Corporation, Gangseo-gu, Seoul (KR)

(72) Inventors: Han Soo Kim, Gimpo-si (KR); Seok Cheol Yang, Busan (KR)

(73) Assignee: Korea Airports Corporation (KR)

( * ) Notice: Subject to any disclaimer, the term of this patent is extended or adjusted under 35 U.S.C. 154(b) by 0 days.

(21) Appl. No.: 15/303,568

(22) PCT Filed: Apr. 27, 2015

(86) PCT No.: PCT/KR2015/004146
§ 371 (c)(1),
(2) Date: Oct. 12, 2016

(87) PCT Pub. No.: WO2015/167179
PCT Pub. Date: Nov. 5, 2015

(65) Prior Publication Data
US 2017/0037587 A1    Feb. 9, 2017

(30) Foreign Application Priority Data
Apr. 30, 2014  (KR) .......... 10-2014-0052323

(51) Int. Cl.
*E01D 19/00* (2006.01)
*E01D 19/08* (2006.01)
*B64F 1/305* (2006.01)
*E01D 15/00* (2006.01)

(52) U.S. Cl.
CPC .......... *E01D 19/086* (2013.01); *B64F 1/305* (2013.01); *E01D 15/00* (2013.01)

(58) Field of Classification Search
CPC ........ E01D 15/00; E01D 19/086; B64F 1/305
USPC ....................... 14/71.5, 69.5, 72.5
See application file for complete search history.

(56) References Cited

FOREIGN PATENT DOCUMENTS

| CN | 201703566 U | 1/2011 |
|---|---|---|
| JP | 2005193830 A | 7/2005 |
| KR | 101020719 B1 | 3/2011 |

OTHER PUBLICATIONS

PCT/KR2015/004146—Written Opinion and International Search Report.

*Primary Examiner* — Raymond W Addie
(74) *Attorney, Agent, or Firm* — Boyle Fredrickson, SC

(57) ABSTRACT

A rainwater receiver of a movable boarding bridge may comprise rainwater receivers provided at: an outer tunnel; an inner tunnel disposed inside the outer tunnel; an inner tunnel footpath equipped in the inner tunnel and configured in the form of a footpath so that passengers can walk thereon; an outer tunnel footpath disposed at the lower end of the inner tunnel footpath and configured in a multilayer form; and the lower end of the outer tunnel footpath. A tunnel path part of the movable boarding bridge configured as above is positioned to be separated from the rainwater receivers so that the rainwater receivers are not seen by passengers inside a tunnel. In addition, since there is no height difference caused by the rainwater receivers, there is an advantage in that problems such as passengers' sprained ankles can be resolved.

20 Claims, 4 Drawing Sheets

RAINWATER RECEIVER OF MOVABLE BOARDING BRIDGE

CROSS-REFERENCE TO RELATED APPLICATIONS

This application claims priority to International Application No. PCT/KR2015-004146, filed on Apr. 27, 2015, and to Korean Patent Application No. KR20140052323, filed on Apr. 30, 2014, the entire contents of which are incorporated herein by reference.

TECHNICAL FIELD

The present invention relates to a rainwater receiver of a movable boarding bridge, and more particularly, to a rainwater receiver of a movable boarding bridge configured to separate an inner tunnel footpath from a rainwater receiver such that the rainwater receiver is invisible when viewed from a tunnel.

BACKGROUND ART

Japanese Patent Laid-Open Publication No. 2005-193830 (Jul. 21, 2005) discloses a general boarding bridge having a structure of an overlapping inner tunnel and outer tunnel and rainwater receivers on each side of a footpath to prevent rainwater from floss lug to the footpath of the inner tunnel when it rains.

The rainwater receivers provided on each side are unattractive because they are in contact with roller drivers and so are easily contaminated by rust, garbage, and oil. Accordingly, the rainwater receivers make the bridge environment unpleasant for passengers. Also, a female passenger wearing high heels may sprain an ankle because the footpath and the rainwater receivers are at different levels.

Thus, there is need to develop an apparatus wherein there is no such level difference and the rainwater receiver of the outer tunnel is separate from the footpath.

DISCLOSURE OF INVENTION

Technical Goals

An aspect of the present invention provides a sale and attractive rainwater receiver of a movable boarding bridge by disposing the rainwater receiver on a floor structure of an inner tunnel.

Another aspect of the present invention provides a rainwater receiver of a movable boarding bridge without a level difference.

Still another aspect of the present invention provides a rainwater receiver of a movable boarding bridge to solve the problem of a carpet being contaminated by rainwater flowing from a rainwater receiver when it rains.

Technical Solutions

According to an aspect of the present invention, there is provided a rainwater receiver of a movable boarding bridge including an outer tunnel, an inner tunnel disposed in the outer tunnel, an inner tunnel footpath provided in a form of a footpath that allows a passenger to pass, the inner tunnel footpath included in the inner tunnel, an outer tunnel footpath provided in a multilayer form, the outer tunnel footpath disposed below the inner tunnel footpath, and a rainwater receiver disposed below the outer tunnel footpath, wherein the outer tunnel footpath by which the passenger passes and the rainwater receiver are separated such that the rainwater receiver is invisible from the outer tunnel footpath.

The inner tunnel may include the inner tunnel footpath, an inner side frame configured to support the inner tunnel footpath, the inner side frame being disposed below the inner tunnel footpath, and a footpath horizontal extension structure configured to allow the inner tunnel footpath and the inner side frame to be separate and to allow the inner tunnel footpath and the inner side frame to be arranged in the multilayer form.

The footpath horizontal extension structure may be provided in a shape of an open ended rectangle. A safety cover may be provided in a gap formed between the outer tunnel and the inner tunnel. Here, the safety cover may be a brush, and the safety cover may be detachable.

An outer side frame configured to form a level difference in the outer tunnel and change a fluid flow of rainwater, and the outer side frame is provided in an L-shape in order to collect rainwater. The rainwater receiver is disposed on a floor structure of the outer tunnel such that the rainwater receiver is invisible to passengers in a tunnel, to solve the problem of a carpet of a footpath being contaminated and a passenger wearing high heels spraining an ankle.

Effects

According to an embodiment of the present invention, it is possible to provide a rainwater receiver invisible to passengers in an outer tunnel and separate from the outer tunnel footpath having no level difference, to solve the problem of a passenger spraining an ankle due to a level difference.

According to another embodiment of the present invention, it is possible to provide a rainwater receiver of a movable boarding bridge to solve the problem of a carpet being contaminated by rainwater flowing from the rainwater receiver when it rains.

BEST MODE FOR CARRYING OUT THE INVENTION

Figure 1:
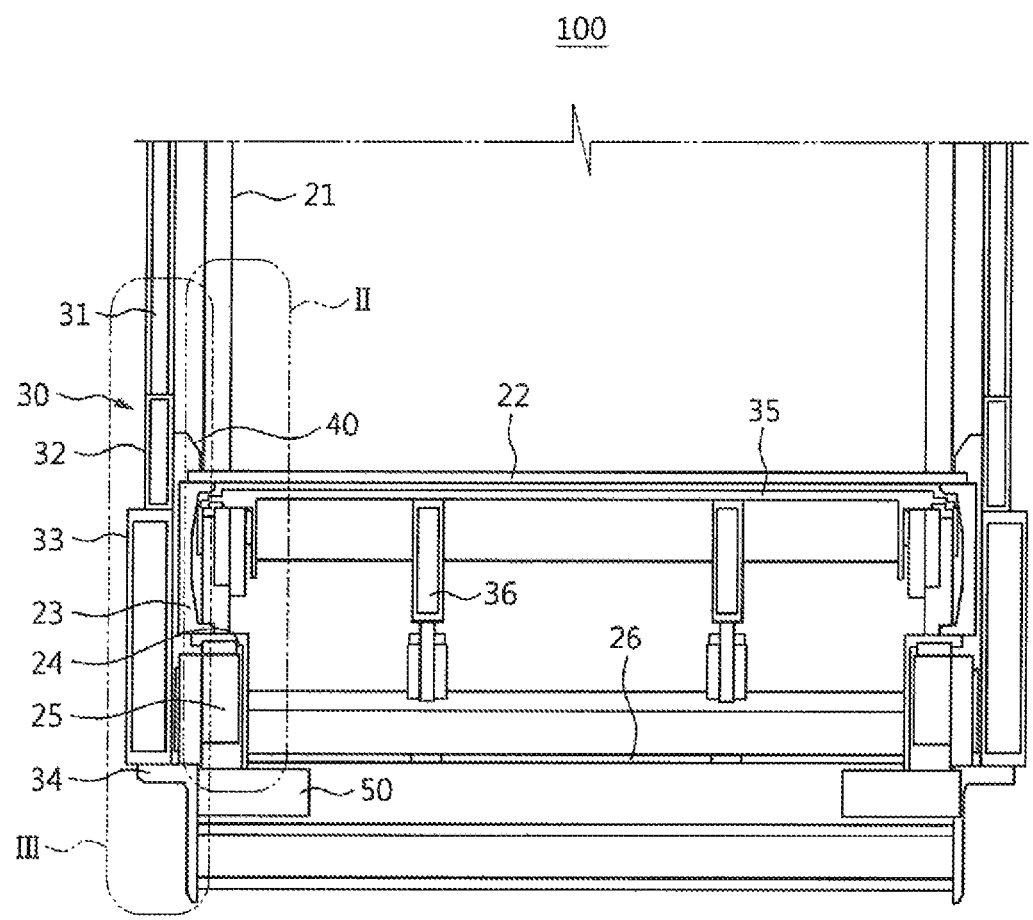
FIG. 1 is a view illustrating a rainwater receiver of a movable boarding bridge according to an embodiment.

FIG. 1 is a view illustrating a rainwater receiver of a movable boarding bridge according to an embodiment. In the movable boarding bridge, an inner tunnel 20 is disposed in an outer tunnel 30. Here, the outer tunnel 30 includes an outer side portion 31, an outer side supporter 32, an outer side frame supporter 33 and an outer side frame 34.

The outer tunnel 30 includes the outer side supporter 32 and the outer side portion 31 disposed on a side of the outer tunnel 30, and a safety cover 40 which has a width identical to that of an inner side portion and the outer side portion 31 such that the safety cover 40 is connected to the outer side supporter 32. Also, the outer tunnel 30 includes the outer side frame supporter 33 which is relatively wide such that it may support the outer side supporter 32 and the outer side frame 34 disposed below the outer side frame supporter 33.

Here, the outer side frame 34 is provided at an angle of 90 degrees to thou a level difference, such that rainwater dropped on the outer side frame 34 flows under the outer side frame 34. An inner frame supporting roller 25 may be supported such that the inner frame supporting roller 25 is not pulled out downward due to the level difference.

The inner tunnel 20 includes an inner tunnel footpath 22 and an inner side supporter 21. An outer tunnel footpath 35 is provided in a multilayer form, and disposed below the inner tunnel footpath 22.

Also, a footpath horizontal extension structure 23 allows the inner tunnel footpath 22 and an inner side frame 24 to be separate and allows the inner tunnel footpath 22 and the inner side frame 24 to be arranged in a multilayer form. The inner frame supporting roller 25 may be disposed below the inner side frame 24, and the inner side frame 24 and the inner frame supporting roller 25 may be provided to distribute a weight of the inner tunnel footpath 22.

Also, the outer tunnel footpath 35 disposed below the inner tunnel footpath 22 is connected to an outer tunnel footpath strengthening supporter 36 and an outer tunnel footpath supporting roller 37, such that the effect of a weight of a passenger passing along the outer tunnel footpath 35 may decrease.

The inner tunnel 20 includes the inner tunnel footpath 22 for the passenger enabling the passenger to use the boarding bridge, the inner side supporter 21 to support a side wall of the inner tunnel footpath 22, the footpath horizontal extension structure 23 to allow the inner tunnel footpath 22 and the inner side frame 24 to be arranged separately, the inner frame supporting roller 25 below the inner side frame 24 to support the inner side frame 24, and a supporter 26 to support and connect each side of inner side frames, for example, the inner side frame 24. Here, the footpath horizontal extension structure 23 is provided in a shape of an open ended rectangle. The inner tunnel 20 is disposed in the outer tunnel 30, and a gap between the inner tunnel 20 and the outer tunnel 30 may be approximately 60 millimeters (mm) wide. To minimize the gap between the inner tunnel 20 and the outer tunnel 30, the footpath horizontal extension structure 23 is formed to be relatively wide. A gap between the outer tunnel footpath 35 and the outer side supporter 32 may be minimized by the footpath horizontal extension structure 23.

When the inner tunnel 20 is disposed in the outer tunnel 30, the safety cover 40 may be provided in the gap between the inner tunnel 20 and the outer tunnel 30 such that a rainwater receiver 50 is invisible. The safety cover 40 may be provided on the outer side supporter 32 on the side of the outer tunnel 30, and the safety cover 40 may be a plurality of brushes. The safety cover 40 may be fixed on the side of the inner tunnel 20, such that the rainwater receiver 50 is invisible from the inner tunnel footpath 22. The safety cover 40 may be detachable. A blind board may be provided on the safety cover 40, and the safety cover 40 may be covered by a brush.

The rainwater receiver 50 may be disposed below the outer tunnel footpath 35.

As illustrated in FIG. 1, the rainwater receiver 50 may be disposed on the side of the outer side frame 34 of the outer tunnel 30 and below the inner frame supporting roller 25.

The outer side frame 34 may be provided in an L-shape to form the level difference, such that the rainwater is dropped downward. The rainwater dropped downward may be collected by the rainwater receiver 50.

The rainwater receiver 50 may be detachable, and an opening having a U-shape or a rectangle shape may be provided at the top of the rainwater receiver 50.

The rainwater in the outer tunnel 30 flowing to the safety cover 40 and then to the gap between the inner tunnel 20 and the outer tunnel 30 may be collected by the rainwater receiver 50. The rainwater may flow below the inner tunnel footpath 22, and the rainwater receiver 50 is invisible from the inner tunnel footpath 22. Accordingly, the inner tunnel footpath 22 may appear more attractive.

Figure 2:
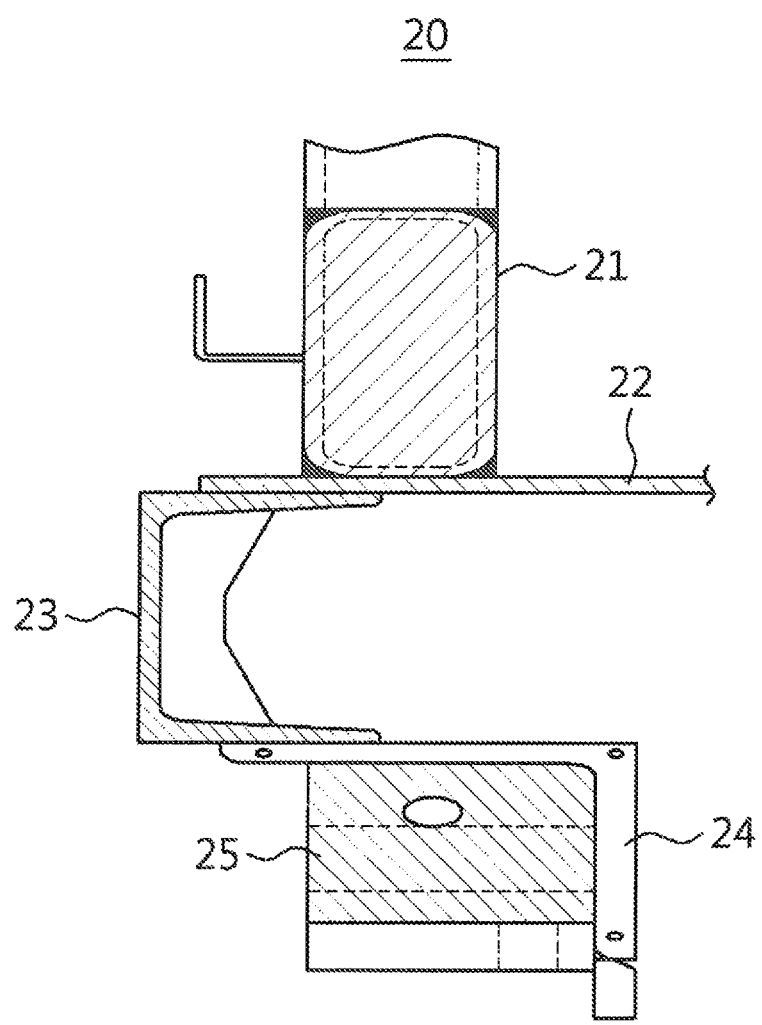
FIG. 2 is an enlarged view illustrating a portion II corresponding to an inner tunnel illustrated in FIG. 1 according to an embodiment.

FIG. 2 is an enlarged view illustrating a portion II corresponding to the inner tunnel 20 illustrated in FIG. 1 according to an embodiment. Descriptions are provided below. The inner tunnel 20 includes the inner tunnel footpath 22, the inner side supporter 21 the inner side frame 24, the footpath horizontal extension structure 23, and the inner frame supporting roller 25.

The inner tunnel 20 includes the inner tunnel footpath 22 disposed on a floor of a footpath used by a passenger, the inner side supporter 21 to support a side wall of the inner tunnel footpath 22, the inner side frame 24 disposed below the inner tunnel footpath 22, the footpath horizontal extension structure 23 to allow the inner tunnel footpath 22 and the inner side frame 24 to be arranged in a multilayer form, and the inner frame supporting roller 25 below the inner side frame 24 to support the inner side frame 24.

The inner tunnel footpath 22 is connected to the inner side frame 24 such that each are separated by a predetermined distance, and the footpath horizontal extension structure 23 may be provided in a shape of an open ended rectangle. Thus, when the inner tunnel 20 is disposed in the outer tunnel 30, the width of the inner tunnel 20 may be relatively wide in order to minimize a gap between the inner tunnel footpath 22 and the inner side frame 24.

The inner side frame 24 may be provided in an L-shape, and the inner frame supporting roller 25 that supports a frame is disposed below the inner side frame 24, such that the inner tunnel footpath 22 may be strongly supported.

Figure 3:
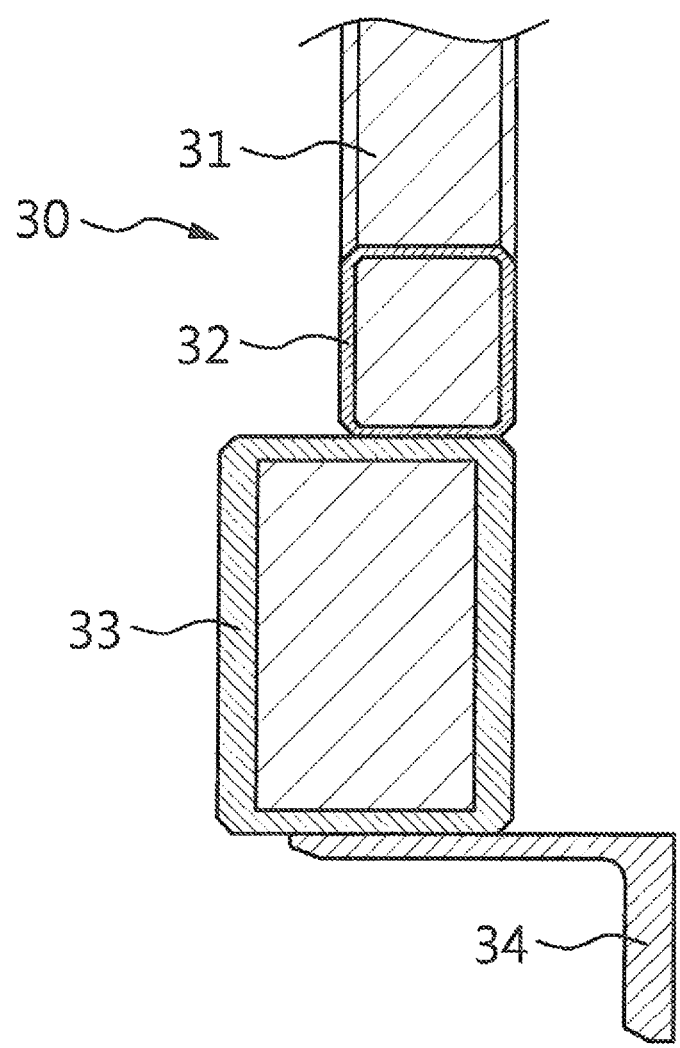
FIG. 3 is an enlarged view illustrating a portion III corresponding to an outer tunnel illustrated in FIG. 1 according to an embodiment.

FIG. 3 is an enlarged view illustrating a portion III corresponding to the outer tunnel 30 illustrated in FIG. 1 according to an embodiment. Descriptions are provided below. The outer tunnel 30 includes the outer side portion 31, the outer side supporter 32, the outer side frame supporter 33, and the outer side frame 34.

The outer side portion 31 and the outer side supporter 32 to support the side of the outer tunnel 30 are connected and disposed above the outer side frame supporter 33 which is relatively wide. The outer side frame supporter 33 is relatively wide such that the outer side frame supporter 33 may support the outer side portion 31. The outer side frame 34 for changing a flow of rainwater is disposed below the outer side frame supporter 33, and the outer side frame 34 is provided to allow the rainwater dropped on the outer side frame 34 to flow downward by forming a level difference.

Here, the outer side frame 34 may be wider than the outer side frame supporter 33, and the outer side frame 34 may be provided in an L-shape. Thus the outer side frame 34 may stretch toward the bottom of the inner tunnel footpath 22, such that the rainwater flows under the inner tunnel 20.

The outer side supporter 32 may include a connecting ring, a screw, and a fastener such that the outer side supporter 32 is connected to the safety cover 40. The safety cover 40 and the outer side supporter 32 may be provided to connect the safety cover 40 to the outer tunnel 30 using the connecting ring or the screw.

Figure 4:
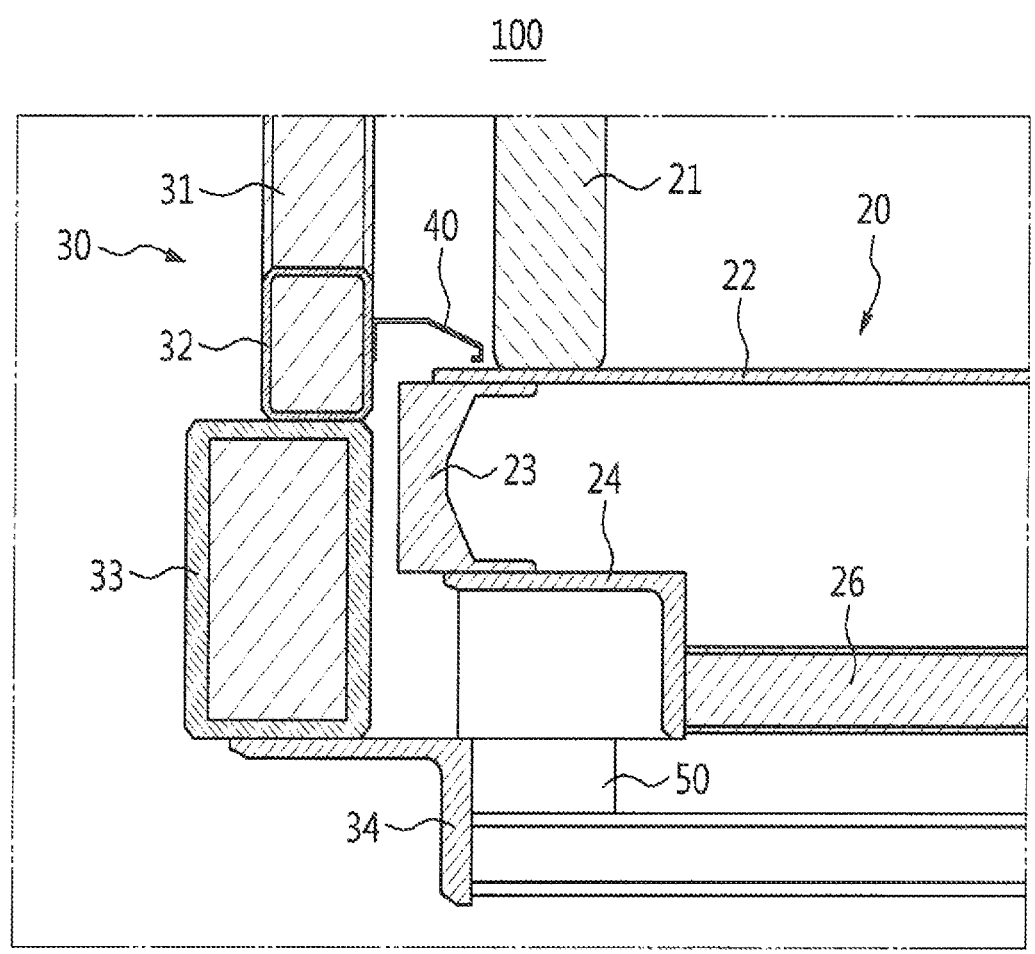
FIG. 4 is a cross-sectional view illustrating a movable boarding bridge having a gap between an inner tunnel and an outer tunnel according to an embodiment.

FIG. 4 is a cross-sectional view illustrating a movable boarding bridge having a gap between an inner tunnel 20 and an outer tunnel 30 according to an embodiment. Repeated descriptions of a configuration of the outer tunnel 30 and a configuration of the inner tunnel 20 will be omitted for increased clarity and conciseness because the descriptions provided with reference to FIGS. 2 and 3 are also applicable to FIG. 4. The outer tunnel footpath 35 is disposed below the inner tunnel footpath 22, a tunnel footpath is provided, in a multilayer form, on a floor structure (the footpath horizontal extension structure 23, the outer tunnel footpath strengthening supporter 36, the outer tunnel footpath supporting roller 37, the inner side frame 24, and the inner frame supporting roller 25), and the tunnel footpath and the rainwater receiver 50 are disposed to be separate. Thus, the rainwater receiver 50 is invisible to passengers in the outer tunnel footpath 35.

In the movable boarding bridge, the rainwater in the inner tunnel 20 may flow under the safety cover 40 through a rainwater guide pipe due to the gap of 60 mm between the inner tunnel 20 and the outer tunnel 30, such that rainwater may flow between the inner tunnel 20 and the outer tunnel 30 and then flow toward the outer side frame 34. When the rainwater is dropped on the outer side frame 34, the rainwater may flow to the rainwater receiver 50 disposed on the side of the outer side frame 34 and then the rainwater may be collected by the rainwater receiver 50.

Because the rainwater receiver 50 is disposed below the outer tunnel footpath 35 by which the passenger passes, the rainwater receiver 50 is invisible to the passenger on the outer tunnel footpath 35. Thus, the outer tunnel footpath 35 may appear more attractive.

Although a few embodiments of the present invention have been shown and described, the present invention is not limited to the described embodiments. Instead, it would be appreciated by those skilled in the art that changes may be made to these embodiments without departing from the principles and spirit of the invention the scope of which is defined by the claims and their equivalents.

The invention claimed is:

1. A rainwater receiver of a movable boarding bridge comprising:
   an outer tunnel;
   an inner tunnel disposed in the outer tunnel,
   an inner tunnel footpath provided in a form of a footpath that allows a passenger to pass, the inner tunnel footpath included in the inner tunnel;
   an outer tunnel footpath provided in a multilayer film, the outer tunnel footpath disposed below the inner tunnel footpath; and
   a rainwater receiver disposed below the outer tunnel footpath,
   wherein the outer tunnel footpath by which the passenger passes and the rainwater receiver are separated such that the rainwater receiver is not visible by the passenger walking the outer tunnel footpath.

2. The rainwater receiver of claim 1, wherein the inner tunnel comprises:
   the inner tunnel footpath;
   an inner side frame configured to support the inner tunnel footpath, the inner side frame being disposed below the inner tunnel footpath; and
   a footpath horizontal extension structure configured to allow the inner tunnel footpath and the inner side frame to be separate and to allow the inner tunnel footpath and the inner side frame to be arranged in the multilayer film.

3. The rainwater receiver of claim 2, wherein the footpath horizontal extension structure is provided in a shape of an open ended rectangle.

4. The rainwater receiver of claim 1, wherein a safety cover is provided in a gap formed between the outer tunnel and the inner tunnel.

5. The rainwater receiver of claim 4, wherein the safety cover is a brush.

6. The rainwater receiver of claim 4, wherein the safety cover is detachable.

7. The rainwater receiver of claim 1, further comprising:
   an outer side frame configured to form a level difference in the outer tunnel and change a fluid flow of rainwater.

8. The rainwater receiver of claim 7, wherein the outer side frame is provided in an L-shape.

9. A rainwater receiver of a movable boarding bridge comprising:
   an outer tunnel;
   an inner tunnel disposed in the outer tunnel, wherein the inner tunnel includes:
      an inner tunnel footpath provided in a form of a footpath that allows a passenger to pass, the inner tunnel footpath included in the inner tunnel,
      an inner side frame configured to support the inner tunnel footpath, the inner side frame being disposed below the inner tunnel, footpath, and
      a footpath horizontal extension structure configured to allow the inner tunnel footpath and the inner side frame to be separate and to allow the inner tunnel footpath and the inner side frame to be arranged in a multilayer form;
   an outer tunnel footpath provided in a multilayer form, the outer tunnel footpath disposed below the inner tunnel footpath; and
   a rainwater receiver disposed below the outer tunnel footpath,
   wherein the outer tunnel footpath by which the passenger passes and the rainwater receiver are separated such that the rainwater receiver is invisible from the outer tunnel footpath.

10. The rainwater receiver of claim 9, wherein the footpath horizontal extension structure is provided in a shape of an open ended rectangle.

11. The rainwater receiver of claim 9, wherein a safety cover is provided in a gap formed between the outer tunnel and the inner tunnel.

12. The rainwater receiver of claim 11, wherein the safety cover is a brush.

13. The rainwater receiver of claim 11, wherein the safety cover is detachable.

14. The rainwater receiver of claim 9, further comprising:
   an outer side frame configured to form a level difference in the outer tunnel and change a fluid flow of rainwater.

15. The rainwater receiver of claim 14, wherein the outer side frame is provided in an L-shape.

16. A rainwater receiver of a movable boarding bridge comprising:
   an outer tunnel;
   an inner tunnel disposed in the outer tunnel;
   an inner tunnel footpath provided in a form of a footpath that allows a passenger to pass, the inner tunnel footpath included in the inner tunnel;
   an outer tunnel footpath provided in a multilayer form, the outer tunnel footpath disposed below the inner tunnel footpath;
   a rainwater receiver disposed below the outer tunnel footpath; and a safety cover provided in a gap formed between the outer tunnel and the inner tunnel, wherein the safety cover is a brush and wherein the outer tunnel footpath by which the passenger passes and the rainwater receiver are separated such that the rainwater receiver is invisible from the outer tunnel footpath.

17. The rainwater receiver of claim 16, wherein the inner tunnel comprises:

the inner tunnel footpath;

an inner side frame configured to support the inner tunnel footpath, the inner side frame being disposed below the inner tunnel footpath; and a footpath horizontal extension structure configured to allow the inner tunnel footpath and the inner side frame to be separate and to allow the inner tunnel footpath and the inner side frame to be arranged in the multilayer form.

18. The rainwater receiver of claim 17, wherein the footpath horizontal extension structure is provided in a shape of an open ended rectangle.

19. The rainwater receiver of claim 16, further comprising:

an outer side frame configured to form a level difference in the outer tunnel and change a fluid flow of rainwater.

20. The rainwater receiver of claim 19, wherein the outer side frame is provided in an L-shape.

\* \* \* \* \*